(12) United States Patent
Bierhuizen

(10) Patent No.: US 7,281,803 B2
(45) Date of Patent: Oct. 16, 2007

(54) POLARIZATION CONVERSION ASSEMBLY TO COMPLEMENT ANGULAR TRANSMISSION DISTRIBUTION OF POLARIZING LIGHT MODULATOR

(75) Inventor: Serge J. A. Bierhuizen, Santa Rosa, CA (US)

(73) Assignee: InFocus Corporation, Wilsonville, OR (US)

( * ) Notice: Subject to any disclaimer, the term of this patent is extended or adjusted under 35 U.S.C. 154(b) by 271 days.

(21) Appl. No.: 10/987,270

(22) Filed: Nov. 12, 2004

(65) Prior Publication Data

US 2006/0103809 A1    May 18, 2006

(51) Int. Cl.
G03B 21/14  (2006.01)
G03B 21/26  (2006.01)
G03B 21/28  (2006.01)
G02F 1/1335 (2006.01)
H04N 5/74   (2006.01)
G02B 27/14  (2006.01)
G02B 27/28  (2006.01)
F21V 9/14   (2006.01)

(52) U.S. Cl. ............... 353/20; 353/37; 349/9; 348/750; 348/758; 335/487; 335/495; 335/629; 362/19

(58) Field of Classification Search ............ 353/20, 353/30, 34, 37; 349/5, 7–9, 56, 96; 348/739, 348/744, 750, 751, 757, 758; 359/483, 487, 359/494–497, 618, 629, 634, 638–640; 362/19
See application file for complete search history.

(56) References Cited

U.S. PATENT DOCUMENTS

| | | | |
|---|---|---|---|
| 5,283,600 A | 2/1994 | Imai | |
| 6,053,615 A | 4/2000 | Peterson et al. | |
| 6,176,586 B1 * | 1/2001 | Hirose et al. | 353/31 |
| 6,646,806 B1 * | 11/2003 | Bierhuizen | 359/618 |
| 6,816,206 B2 * | 11/2004 | Yamamoto | 349/5 |
| 6,899,440 B2 | 5/2005 | Bierhuizen | |
| 7,111,941 B2 * | 9/2006 | Allen et al. | 353/31 |
| 2002/0063818 A1 * | 5/2002 | Anderson et al. | 349/96 |

* cited by examiner

*Primary Examiner*—Rochelle Blackman
(74) *Attorney, Agent, or Firm*—Schwabe Williamson & Wyatt

(57) ABSTRACT

An apparatus, system, and method for a polarizing conversion assembly adapted to provide polarized light having an intensity distribution to complement an angular transmission distribution of a corresponding light modulator are disclosed herein.

13 Claims, 4 Drawing Sheets

POLARIZATION CONVERSION ASSEMBLY TO COMPLEMENT ANGULAR TRANSMISSION DISTRIBUTION OF POLARIZING LIGHT MODULATOR

FIELD OF THE INVENTION

Embodiments of the invention relate generally to the field of polarization in projection systems. More particularly, embodiments of the invention relate to a polarization conversion assembly adapted to complement an angular transmission distribution of a polarizing light modulator.

BACKGROUND OF THE INVENTION

Many light modulators used in projection and direct viewing systems operate on the basis of polarization. Such light modulators may include reflective displays such as LCoS (Liquid Crystal on Silicon), super twisted nematic (STN), and ferroelectric (FLC) as well as transmissive displays, such as thin film transistor (TFT), polysilicon (P-si), and Silicon-on-Insulator (SOI). These displays can produce a high-resolution image by changing the polarization state upon reflection or transmission of incident light. In a LCoS display, for example, in the dark state, a pixel reflects all light with substantially no change in polarization. In the bright state, the pixel rotates the polarization state of reflected incident light to the corresponding orthogonal state. A light modulator may also include a polarization-analyzing device designed to propagate the light from the bright state as a display image to be viewed by the human eye or projected onto a viewing screen.

Because light typically contains multiple polarization states, a polarization conversion assembly is often used to convert or rotate the light from a light source to substantially one polarization state. Having light of one polarization state may allow for more efficient processing through the light modulator.

A multi-PBS can be used as a polarization conversion assembly. The multi-PBS has a two-dimensional array of small polarizing beam splitters and associated lenses. The beam splitters and lenses are precisely aligned so that the output of the multi-PBS is substantially collimated and has a single polarization state. The multi-PBS converts almost all of the input light to the same polarization state. However, it is expensive to produce due to the complex structures required and the precision required to align each of the PBS structures with each lens. The multi-PBS therefore increases the cost of the projection system.

Another disadvantage of the multi-PBS system comes from a difference in the transmissivity over different incident angles in a typical light modulator between orthogonal axes. Conventional polarization conversion assemblies, including the multi-PBS, transmit the polarized light with a substantially uniform intensity distribution. More particularly, the polarized light from a conventional polarization conversion assembly is point symmetrical around the center. The light modulator, on the other hand, may have an angular transmission distribution that is not point symmetrical around the center, resulting in a significant portion of the light from the polarization conversion assembly illuminating the light modulator at incident angles with a lower probability of transmission.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Illustrative embodiments of the present invention include a polarizing conversion assembly adapted to provide polarized light having an intensity distribution to complement an angular transmission distribution of a corresponding light modulator, and methods practiced thereon.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments. In particular, a wide variety of optical components such as prisms, mirrors, lenses, integration elements, etc. may be used as appropriate to fold, bend, or modify the illumination for the intended application. Integration of these optical components into illustrated embodiments may not be specifically addressed unless it is necessary to develop relevant discussion of embodiments of the present invention.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
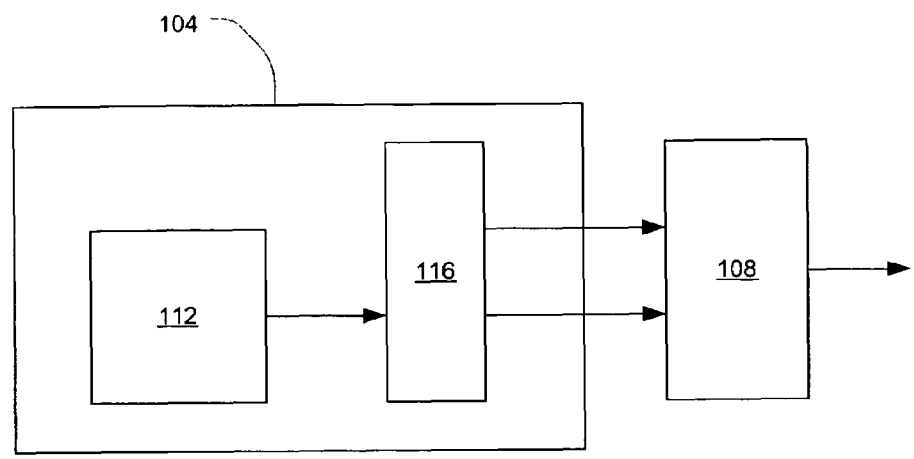
FIG. 1 is a simplified block diagram of an illumination module and a light modulator, in accordance with an embodiment of the present invention.

An example of one embodiment of the present invention is shown in FIG. 1. In brief, an illumination module 104 provides polarized light to be incident upon a light modulator 108. The light modulator 108 may process the polarized light by selectively routing the light to and from one or more displays and, ultimately, out as image bearing light. This selective routing of the light may be done by components such as, but not limited to, reflective polarizers (e.g., polarizing beam splitters) and colored filters.

In one embodiment, one or more of these light modulator 108 components may have an angular transmission distribution that is elongated in one direction. Therefore, in order to increase the overall transmission of light through the light modulator 108, the polarized light presented to the light modulator 108 from the illumination module 104 may be presented in such a manner to complement the angular transmission distribution. Complementing the angular transmission distribution in such a manner may increase the probability of light transmission through the light modulator 108. As a result, lower cost at equal or higher system performance in brightness and contrast may be achieved compared to an illumination module that provides light with a point symmetrical distribution to the light modulator 108.

The illumination module 104 of this embodiment may include a light source 112 and a polarization conversion assembly 116 optically coupled to one another as shown. The light source 112 may emit light having multiple polarization states, which may be converted to substantially the same polarization state by the polarization conversion assembly 116. Examples of the light source 112 could include, but are not limited to, a gaseous discharge lamp (e.g., high-pressure mercury and metal halide), an incandescent filament (e.g., tungsten halogen), a light-emitting diode, and a laser diode.

Figure 2:
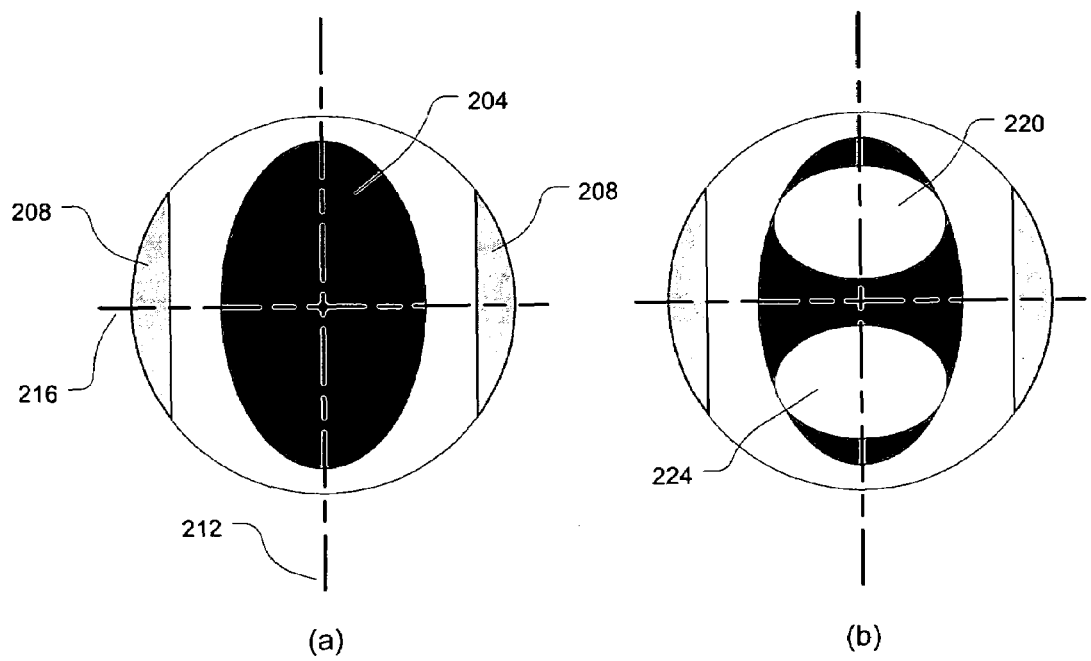
FIG. 2(a) is a pupil diagram representing the angular transmission distribution of the light modulator, in accordance with an embodiment of the present invention.
FIG. 2(b) is a pupil diagram representing the angular transmission distribution of the light modulator overlaid with an intensity distribution of light transmitted by the illumination module, in accordance with an embodiment of the present invention.

FIG. 2(a) depicts a pupil diagram of an angular transmission distribution of the light modulator 108, in accordance with one embodiment. A high transmission area 204 may transmit light with greater range of incident angles than a corresponding low transmission area 208. In this embodiment, the high transmission area 204 may be roughly elliptical with a major axis 212 and a minor axis 216. The major axis 212 may also be referred to as the axis of greater angular transmission characteristic or the greater angular acceptance.

Polarized light from the illumination module 104 may be presented to the light modulator 108 so that a substantial portion of the light is incident within the high transmission area 204. That is, the intensity of the light may be spread in the direction of the major axis 212. FIG. 2(b) illustrates the polarized light being incident upon the pupil of the light modulator 108 with an intensity distribution that complements the angular transmission distribution of the light modulator 108. In this embodiment, the illumination module 104 may present illumination bundles resulting in first and second hot spots 220 and 224 that may be centered with respect to the major axis 212. The hot spots 220 and 224 may additionally, or alternatively, be substantially symmetrical to one another around the minor axis 216. Spreading the intensity of the light with respect to the major axis 212 may result in more light being transmitted through the light modulator 108 than if the intensity were symmetrically diminishing around a central point.

The center of the two hot spots 220 and 224 may correspond to a central area with an average incident angle close to perpendicular. The average angle of the incident light may diverge steadily from the perpendicular with distance from the center.

Major and minor axes are used in the present description to aid in understanding and convenience. The designation of particular axes can be adapted to suit any particular application and need not be major/minor, Cartesian, or orthogonal. Diagonal and polar directions can also be used to spread the light's intensity distribution so as to increase transmission.

Figure 3:
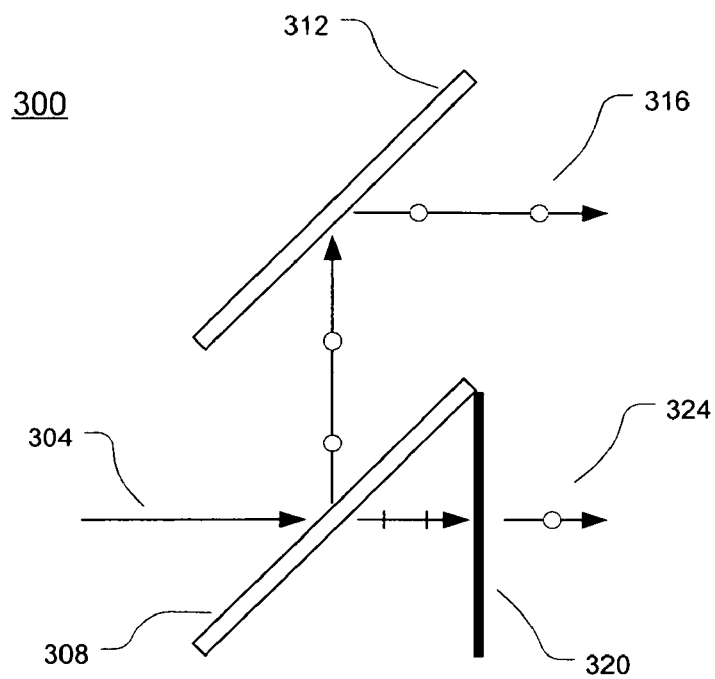
FIG. 3 is a simplified plan view of a polarization conversion assembly, in accordance with an embodiment of the present invention.

FIG. 3 illustrates a polarization conversion assembly 300 in accordance with an embodiment of the present invention. The polarization conversion assembly 300 may be used in place of the polarization conversion assembly 116 described in above embodiments. In this embodiment the polarization conversion assembly 300 receives light 304 having multiple polarization states along a first optical path. A reflective polarizer 308 receives the light and transmits light of one polarization state, e.g., P-polarized light (denoted in the figures by small transverse lines in the optical paths), while reflecting light of a substantially orthogonal polarization state, e.g., S-polarized light (denoted in the figures by small circles in the optical paths). The reflected S-polarized light is additionally reflected by a reflecting device 312 and propagated as a first illumination bundle 316. The P-polarized light transmitted through the reflective polarizer 308 is subsequently transmitted through a polarization conversion device such as a half-wave plate 320 where the light is rotated to the S-polarized state and propagated as a second illumination bundle 324.

At the light modulator 108, the intensity distribution of the illumination bundles 316 and 324 produced by the polarization conversion assembly 300 may look like two elongated hot spots, one above the other, similar to the hot spots 220 and 224 shown in FIG. 2(b). The lower hot spot will come from the lower optical path direct from the light source 112 through the half-wave plate 320. The second hot spot comes from the upper optical path from the reflecting device 312.

The reflective polarizer 308 may be, for example, a prism, a polarizing beam splitter (PBS), a wire grid, a film, etc. The reflecting device 312 may be a reflective coating, a prism, or an optical element angled such that an incident angle is greater than the critical angle for total internal reflection.

The designation of P- and S-polarized light as shown and discussed is for elucidation of the illustrated embodiments. Other embodiments may employ a converse polarization scheme, e.g., a polarization conversion assembly may transmit P-polarized illumination bundles to the light modulator. Additionally, other embodiments may use other polarization states.

Figure 4:
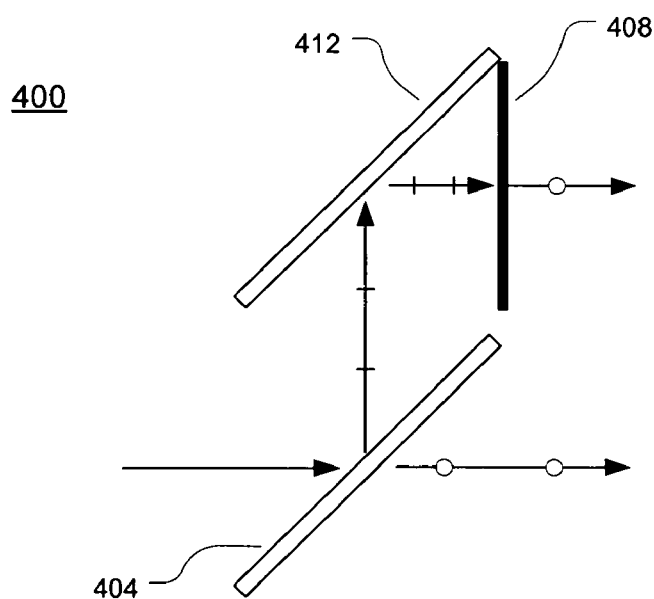
FIG. 4 is a simplified plan view of a polarization conversion assembly, in accordance with another embodiment of the present invention.

FIG. 4 illustrates a polarization conversion assembly 400 in accordance with another embodiment of the present invention. This embodiment is similar to the previously discussed embodiment; however, the reflective polarizer 404 is adapted to transmit S-polarized light and reflect P-polarized light. The reflected P-polarized light is then redirected through a polarization conversion device such as a half-wave plate 408 with a reflecting device 412. The functionality of the reflective polarizer 404, the half-wave plate 408, and the reflecting device 412 may be similar to the above embodiment.

Figure 5:
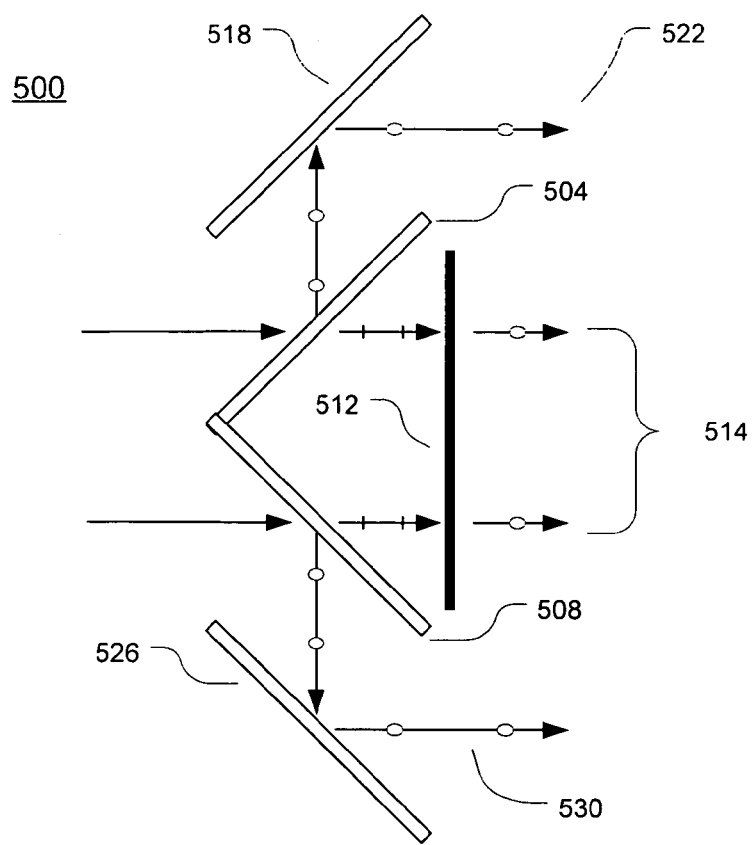
FIG. 5 is a simplified plan view of a polarization conversion assembly, in accordance with yet another embodiment of the present invention.

Although embodiments discussed with reference to FIG. 3 and FIG. 4 illustrate polarization conversion assemblies producing two, substantially elliptical, illumination bundles, other embodiments may not be so limited. For example, FIG. 5 illustrates a polarization conversion device 500 producing three illumination bundles in accordance with another embodiment of the present invention. In this embodiment, a pair of reflecting polarizers 504 and 508 may be arranged to receive light having multiple polarization states. The reflecting polarizers 504 and 508 may pass light of the P-polarization state and reflect light of the S-polarization state. The transmitted P-polarized light may be rotated to the S-polarization state by a polarization conversion device such as a half-wave plate 512 and then propagated as a first illumination bundle 514. S-polarized light may be reflected from the reflective polarizer 504 and again from a reflecting device 518 and be propagated as a second illumination bundle 522. S-polarized light may also be reflected in a similar manner from reflective polarizer 508 and reflecting device 526 and be propagated as a third illumination bundle 530.

Figure 6:
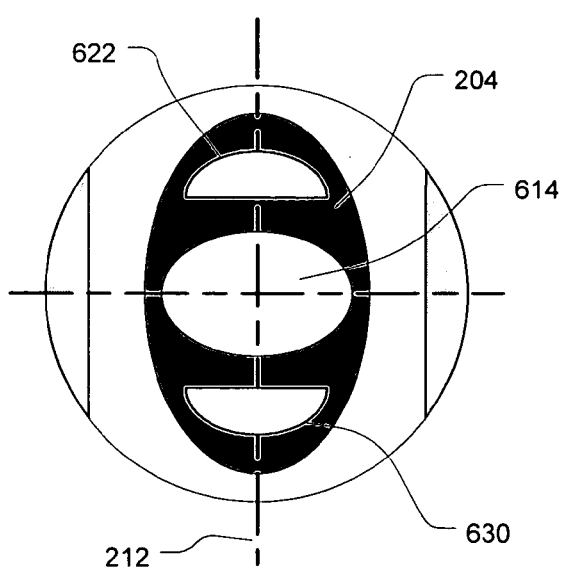
FIG. 6 is a pupil diagram representing the angular transmission distribution of the light modulator overlaid with an intensity distribution of light transmitted by the polarization conversion assembly of FIG. 5, in accordance with an embodiment of the present invention.

FIG. 6 illustrates the intensity distribution of the polarization conversion device 500 overlaying the angular transmission distribution discussed with reference to FIG. 2(a). In this embodiment the illumination bundles 514, 522, and 530 may appear as three hot spots 614, 622, and 630, respectively. These hot spots 614, 622, and 630 may be aligned along the major axis 212 of the high transmission area 204. In an embodiment where the incoming light beam is equally divided between the upper and the lower paths, the first hot spot 614 may be approximately twice the size of the other hot spots 622 and 630. Therefore in one embodiment, and as shown, the hot spot 614 having the greatest area may be centered with respect to the high transmission area 204 in order to correspond with the area of greatest transmissivity.

Figure 7:
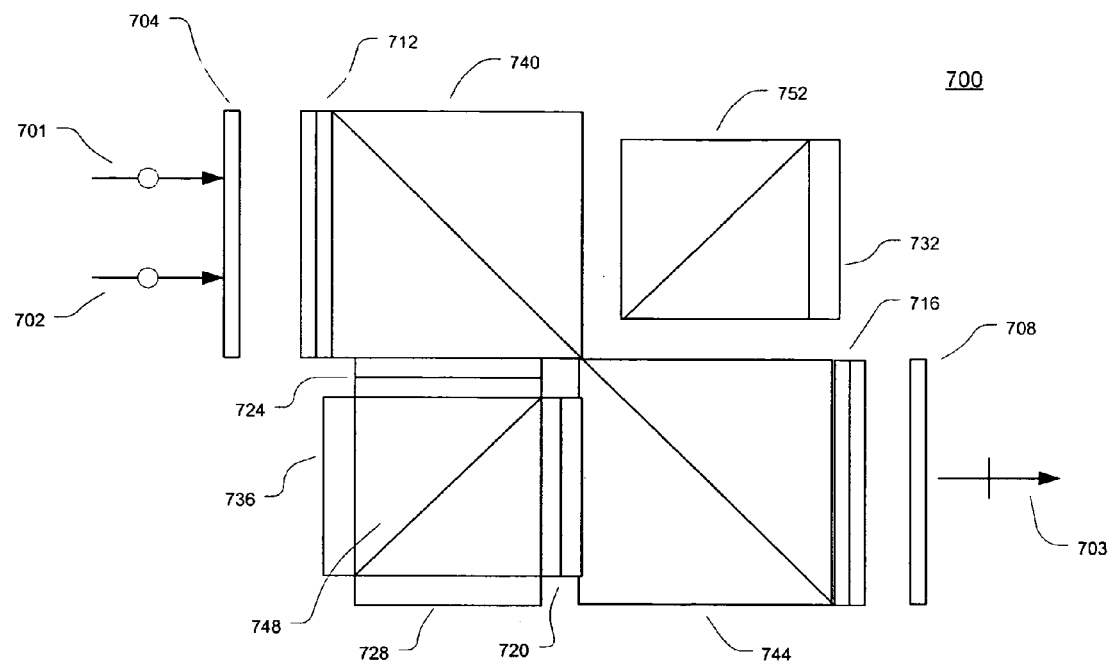
FIG. 7 is a simplified plan view of a light modulator, in accordance with an embodiment of the present invention.

FIG. 7 illustrates a light modulator 700 in accordance with an embodiment of the present invention. In order to describe the light modulator 700 of this embodiment, an overview of the various optical components and their arrangements will be briefly described. The optical components can include a first and second polarizers 704 and 708 (optional), two mismatched magenta and green (MG) filters 712 and 716, two identical red and blue (RB) filters 720 and 724, a red liquid crystal on silicon (LCOS) display 728, a green LCOS display 732, and a blue LCOS display 736. The M, G, R and B filters may be wavelength selective retardation filters. Additionally, illustrated in FIG. 7, light modulator 700 includes light modulating components to reflect light within the light modulator 700, in particular, four polarizing beamsplitter (PBS) cubes 740, 744, 748, and 752 are optically coupled in a predetermined manner to facilitate reflection and transmission of light within the light modulator 700 to and from other various light modulating components based on the polarization of the light. The four PBS cubes 740, 744, 748, and 752 are referred to as cubes for ease of understanding the invention; however, the four PBS cubes 740, 744, 748, and 752 may be cubelike. Alternatively, other reflective polarizers such as wire grid polarizers or stacked film polarizers may be used.

The first and second polarizers 704 and 708 may be linear polarizers used to "clean up" the polarization state of the light. This may facilitate in compensating for inefficiencies of the PBS and work to improve the contrast ratio of the system. Examples of the polarizers could include, but are not limited to, an iodine-based PVA (polyvinyl alcohol) film or a wire grid polarizer. Analyzers and polarizing filters can also be placed in other locations as may be appropriate for a particular application or lamp system.

As illustrated in FIG. 7, the predetermined manner in which the optical components, polarizers 704 and 708, MG and RB filters 712, 716, 720, and 724, LCOS displays 728, 732, and 736, and PBS cubes 740, 744, 748, and 752, are optically coupled, is a compact square shape (i.e., compact cubic shape). This architecture may be referred to as a quad architecture.

In FIG. 7, the four PBS cubes 740, 744, 748, and 752 may vary in size and shape. In this embodiment the first and second PBS cubes 740 and 744 may be the same size and may also be larger than the third and fourth PBS cubes 748 and 752. However, in other embodiments the PBS cubes 740, 744, 748, and 752 may all have equal sizes and shapes.

Incoming illumination bundles 701 and 702 may enter the light modulator 700, be separated into primary colors (e.g., red, green, and blue), and presented to the LCOS display corresponding to that particular color. The LCOS displays 728, 732, and 736 may selectively modulate the polarization state of light incident upon certain pixels in order to produce primary-colored image bearing light. This primary-colored image bearing light may then be recombined and transmitted out of the light modulator 700 as colored image bearing light 703.

The brightness of the colored image bearing light 703 may depend on the P-transmission (Tp) and the S-reflection (Rs) of the PBS cubes 740, 744, 748, and 752. The brightness may be roughly proportional to $Tp^2*Rs^2$, and because the S-reflection may be approximately equal to one, the P-transmission may limit the effective brightness of the image bearing light 703. Therefore, in order to increase the effective P-transmission, the incoming illumination bundles may be presented in a manner complementary to the transmission properties of the PBS cubes 740, 744, 748, and 752.

The benefit of having the intensity distribution complementing the angular transmission distribution is greater the larger the number of polarizers and PBSs. In the above embodiment, for example, several prisms are used to separate colors for different displays and then to recombine them for transmittal. As a result, multiple PBS surfaces may be used in a single system. The complementary spreading of the angular intensity may provide benefits at each one of these surfaces, which has the potential to significantly enhance the brightness and contrast of the final image. The benefits may also be greater when the polarizing layer is at an angle to the central ray of the incident illumination as, for example, with a typical polarizing beam splitter cube. In other embodiments, benefits may also be realized for small direct viewing prism-based displays.

Figure 8:
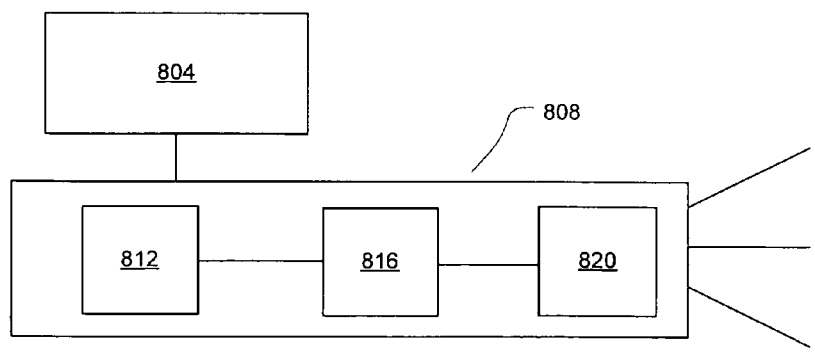
FIG. 8 is a simplified block diagram of a projection system in accordance with an embodiment of the present invention.

FIG. 8 is a simplified pictorial plan view of a system including a video unit 804 coupled to a projection device 808, in accordance with an embodiment of the present invention. In this embodiment the video unit 804 may transmit video signals to the projection device 808, which may include an illumination module 812 optically coupled to a light modulator 816, which is in turn optically coupled to projection optics 820. The components of the projection device 808 may cooperate with one another to jointly effectuate rendering of desired images, which may be image frames of a video, based on the transmitted video signals.

The video unit 804 may include a personal or laptop computer, DVD, set-top box (STB), video camera, video recorder, an integrated television tuner, or any other suitable device to transmit video signals to the projection device 808.

In various embodiments, the system may be, for example, a projector or a projection television.

The illumination module 812 may include a polarization conversion assembly similar to the polarization conversion assemblies discussed with reference to earlier embodiments. Accordingly, the illumination module 812 may be adapted to provide polarized light having an intensity distribution to complement an angular transmission distribution of the light modulator 816.

Importantly, while embodiments of the present invention are described with reference to a video projector, the embodiments discussed herein are equally applicable to any type of illumination system for a polarization-based display, whether for projection or direct viewing, whether compact or not. For example, the techniques described herein are thought to be useful in connection with computer and data device displays, television and movie projectors, internet appliance viewers, and entertainment systems for video and game players.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
   a light source adapted to produce light having multiple polarization states;
   a polarization conversion assembly, having a first reflective polarizer, a first mirror, and a polarization conversion device, adapted to receive the light from the light source and to produce light of a first polarization state with an intensity distribution,
      the first reflective polarizer being adapted to receive a first portion of the light from the light source, to transmit the light of a second polarization state towards the polarization conversion device to be converted to the first polarization state and transmitted as a first portion of a first illumination bundle, and to reflect the light of the first polarization state,
      the first mirror being adapted to receive the light of the first polarization state reflected from the first reflective polarizer and to redirect it as a second illumination bundle;
   a light modulator, having an angular transmission distribution, to receive the light from the polarization conversion assembly and to transmit image bearing light; and
   the intensity distribution adapted to complement the angular transmission distribution,
   wherein the light modulator has a first axis and a second axis, and the angular transmission distribution is greater on the first axis than the second axis, and
   the polarization conversion assembly further comprises:
      a second reflective polarizer adapted to receive a second portion of the light from the light source, to transmit the light of the second polarization state towards the polarization conversion device to be converted to the first polarization state and transmitted as a second portion of the first illumination bundle, and to reflect the light of the first polarization state; and
      a second mirror adapted to receive the light of the first polarization state reflected from the second reflective polarizer and to redirect it as a third illumination bundle to be substantially centered on the first axis.

2. The apparatus of claim 1, wherein the light modulator comprises:
   a first display; and
   a first polarizing beam splitter.

3. The apparatus of claim 2, wherein the light modulator further comprises:
   a second and third display; and
   second, third, and fourth polarizing beam splitters arranged in a quad architecture with the first, second, and third displays.

4. The apparatus of claim 2, wherein the first display comprises a reflective liquid crystal on silicon display.

5. A system comprising:
   an illumination module having
      a light source adapted to produce light of multiple polarization states, and
      a polarization conversion assembly, having a first reflective polarizer, a first mirror, and a polarization conversion device, adapted to receive the ligth from the light source and to produce light of a first polarization state with an intensity distribution,
         the first reflective polarizer being adapted to receive a first portion of the light from the light source, to transmit the light of a second polarization state towards the polarization conversion device to be converted to the first polarization state and transmitted as a first portion of a fist illumination bundle, and to reflect the light of the first polarization state,
         the first mirror being adapted to receive the light of the first polarization state from the first reflective polarizer reflected from the first reflective polarizer and to redirect it as a second illumination bundle;
   a light modulator, having an angular transmission distribution, adapted to receive the light from the polarization conversion assembly and to transmit image bearing light, the intensity distribution adapted to complement the angular transmission distribution; and
   a projection lens, adapted to receive and project the image bearing light
   wherein the light modulator has a first axis and a second axis, and the angular transmission distribution is greater on the first axis than the second axis, and the polarization conversion assembly further comprises:
      a second reflective polarizer adapted to receive a second portion of the light from the light source, to transmit the light of the second polarization state towards the polarization conversion device to be converted to the first polarization state and transmitted as a second portion of the first illumination bundle, and to reflect the light of the first polarization state; and
      a second mirror adapted to receive the light of the first polarization state reflected from the second reflective polarizer and to redirect it as a third illumination bundle to be substantially centered on the first axis.

6. The system of claim 5, wherein the light modulator comprises:
   a first display; and
   a first polarizing beam splitter.

7. The system of claim 6, wherein the light modulator further comprises:
  a second and third display; and
  second, third, and fourth polarizing beam splitters arranged in a quad architecture with the first, second, and third displays.

8. The system of claim 6, wherein the first display comprises a reflective liquid crystal on silicon display.

9. The system of claim 5, wherein the illumination module, light modulator, and projection lens comprise a projection module and the system further comprises:
  a video unit adapted to output a video signal; and
  the projection module, coupled to video unit, adapted to receive the video signal and to project a video.

10. The system of claim 9, wherein the video unit is a selected one of a group consisting of a digital versatile disk (DVD), a set-top box, and an integrated television tuner.

11. A method comprising:
  receiving light having multiple polarization states;
  converting the light into light of a first polarization state;
  transmitting the light of the first polarization state with an intensity distribution;
  said receiving, converting, and transmitting done through a polarization conversion assembly having a mirror, a first polarization conversion device, and a first reflective polarizer;
  said receiving, converting, and transmitting including
    receiving a first portion of the light having multiple polarization states with the first reflective polarizer,
    transmitting the light of the second polarization state and reflecting the light of the first polarization state with the first reflective polarizer,
    converting the transmitted light of the second polarization state to light of the fist polarization state with the first polarization conversion device,
    transmitting the converted light as a first portion of a first illumination bundle,
    redirecting the reflected light of the first polarization state reflected from the first reflective polarizer as a second illumination bundle;
  receiving the light with a light modulator having an angular transmission distribution, with the intensity distribution adapted to complement the angular transmission distribution;
  receiving a second portion of the light having multiple polarization states with a second reflective polarizer;
  transmitting the light of the second polarization state and reflecting the light of the first polarization state with the second reflective polarizer;
  converting the transmitted light of the second polarization state to light of the first polarization state with a second polarization conversion device;
  transmitting the converted light as a second portion of the first illumination bundle; and
  redirecting the reflected light of the first polarization state reflected from the second reflective polarizer as a third illumination bundle.

12. The method of claim 11, wherein said transmitting the light of the first polarization state with an intensity distribution further comprises:
  simultaneously transmitting the first and second illumination bundles.

13. The method of claim 12, wherein the light modulator comprises a polarizing beam splitter having a first and second axis with the angular transmission distribution being greater for incident angles parallel with the first axis than incident angles parallel with the second axis, wherein the method further comprises:
  receiving the first and second illumination bundles centered on the first axis of the polarizing beam splitter.

* * * * *

UNITED STATES PATENT AND TRADEMARK OFFICE
CERTIFICATE OF CORRECTION

PATENT NO. : 7,281,803 B2  Page 1 of 1
APPLICATION NO. : 10/987270
DATED : October 16, 2007
INVENTOR(S) : Serge J. A. Bierhuizen It is certified that error appears in the above-identified patent and that said Letters Patent is hereby corrected as shown below:

Col. 8, line 26, "...the ligth..." should read --...the light...--;

Col. 8, line 34, "...a fist illumination..." should read --...a first illumination...--;

Col. 9, line 34, "...the fist polarization..." should read --...the first polarization...-- [ld. at p.6 (Claim 28).]

Signed and Sealed this

Third Day of March, 2009

JOHN DOLL
*Acting Director of the United States Patent and Trademark Office*